US012597950B2

(12) United States Patent
Hsin

(10) Patent No.: US 12,597,950 B2
(45) Date of Patent: *Apr. 7, 2026

(54) CONFIGURABLE MULTIBAND ACTIVE GNSS ANTENNA

(71) Applicant: KYOCERA AVX Components (San Diego), Inc., San Diego, CA (US)

(72) Inventor: Jesse Shihchieh Hsin, San Diego, CA (US)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,075

(22) Filed: Jul. 26, 2024

(65) Prior Publication Data

US 2024/0388314 A1    Nov. 21, 2024

Related U.S. Application Data

(63) Continuation of application No. 17/887,950, filed on Aug. 15, 2022, now Pat. No. 12,081,242.

(51) Int. Cl.
H04B 1/00    (2006.01)
H04L 27/02    (2006.01)

(52) U.S. Cl.
CPC ........... H04B 1/0053 (2013.01); H04L 27/02 (2013.01)

(58) Field of Classification Search
CPC ...... H04B 1/0053; H04B 1/0458; H04B 1/18; H04L 27/02
See application file for complete search history.

(56) References Cited

U.S. PATENT DOCUMENTS

| 9,325,543 | B2 | 4/2016 | Desclos et al. |
| 9,768,991 | B2 | 9/2017 | Desclos et al. |
| 10,263,817 | B1 | 4/2019 | Roe et al. |
| 10,587,438 | B2 | 3/2020 | Roe et al. |
| 11,189,925 | B2 | 11/2021 | Eslami |
| 2012/0229347 | A1 | 9/2012 | Jin et al. |
| 2014/0133525 | A1 | 5/2014 | Desclos et al. |
| 2014/0176376 | A1 | 6/2014 | Schneider et al. |
| 2016/0268834 | A1 | 9/2016 | Satyamoorthy et al. |
| 2019/0027833 | A1 | 1/2019 | Ayala Vazquez et al. |

(Continued)

OTHER PUBLICATIONS

Extended European Search Report for corresponding European Application No. 23190265.1, dated Jan. 30, 2024, 7 pages.

*Primary Examiner* — Vineeta S Panwalkar
(74) *Attorney, Agent, or Firm* — Dority & Manning, P.A.

(57)    ABSTRACT

An antenna system may include an antenna operable in a selected frequency band of a plurality of frequency bands. In some examples, the antenna system may include an antenna circuit having an RF (radio frequency) communication path and one or more configurable elements in the RF communication path. The antenna system may include a transmission line coupled to the antenna circuit. The antenna system may include a control unit configured to modulate a control signal onto an RF signal to generate a transmit signal for communication over the transmission line to the antenna circuit. The antenna circuit may be configured to demodulate the control signal from the transmit signal. The antenna circuit may be operable to adjust the one or more configurable elements in the RF communication path based at least in part on the control signal to configure the RF communication path to operate in the selected frequency band.

16 Claims, 9 Drawing Sheets

(56)        References Cited

U.S. PATENT DOCUMENTS

| | | | |
|---|---|---|---|
| 2019/0079549 | A1 | 3/2019 | Lam et al. |
| 2019/0394072 | A1 | 12/2019 | Roe et al. |
| 2020/0091608 | A1 | 3/2020 | Alpman et al. |
| 2020/0251823 | A1 | 8/2020 | Singh |
| 2021/0344383 | A1 | 11/2021 | Pajona et al. |
| 2023/0179253 | A1 | 6/2023 | Pon |

600 band 0 ⟶ | 1 | 0 | 1 | 1 | 0 | 0 | 0 | 1 | 0 | 0 | 0 | ⟵602 band 1 ⟶ | 0 | 1 | 1 | 1 | 1 | 0 | 0 | 1 | 0 | 1 | 1 | ⟵604 band 2 ⟶ | 0 | 0 | 0 | 1 | 0 | 1 | 1 | 0 | 1 | 0 | 0 | ⟵606 band 3 ⟶ | 1 | 1 | 0 | 0 | 1 | 1 | 0 | 0 | 1 | 1 | 1 | ⟵608

| 0 | 0 | 0 | 1 | 0 | 1 | 1 | 0 | 1 | 0 | 0 | ⟵606

440

Band Z

CONFIGURABLE MULTIBAND ACTIVE GNSS ANTENNA

PRIORITY CLAIM

The present application is a continuation of U.S. Non-Provisional application Ser. No. 17/887,950, titled "Configurable Multiband Active GNSS Antenna," filed on Aug. 15, 2022, the entirety of which is incorporated by reference herein.

FIELD

Example aspects of the present disclosure relate to antennas.

BACKGROUND

Signals from global navigation satellite system (GNSS) satellites are being increasingly used in navigation and positioning applications, for instance in location tracking applications. GNSS satellites provide global coverage of signals in multiple frequency bands that transmit positioning and timing data. Antenna systems configured for GNSS applications can include GNSS receivers that use the data to determine location.

SUMMARY

Aspects and advantages of embodiments of the present disclosure will be set forth in part in the following description, or can be learned from the description, or can be learned through practice of the embodiments.

Example aspects of the present disclosure are directed to an antenna system. The antenna system may include an antenna operable in a selected frequency band of a plurality of frequency bands and an antenna circuit. The antenna circuit may include an RF (radio frequency) communication path and one or more configurable elements in the RF communication path. The antenna system may include a transmission line that is coupled to the antenna circuit. The antenna system may include a control unit that is configured to modulate a control signal onto an RF signal to generate a transmit signal for communication over the transmission line to the antenna circuit. The antenna circuit may be configured to demodulate the control signal from the transmit signal communicated over the transmission line. The antenna circuit may be operable to adjust the one or more configurable elements in the RF communication path based at least in part on the control signal to configure the RF communication path to operate in the selected frequency band. The antenna may include a plurality of antennas or a multiband antenna operable over the plurality of frequency bands.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
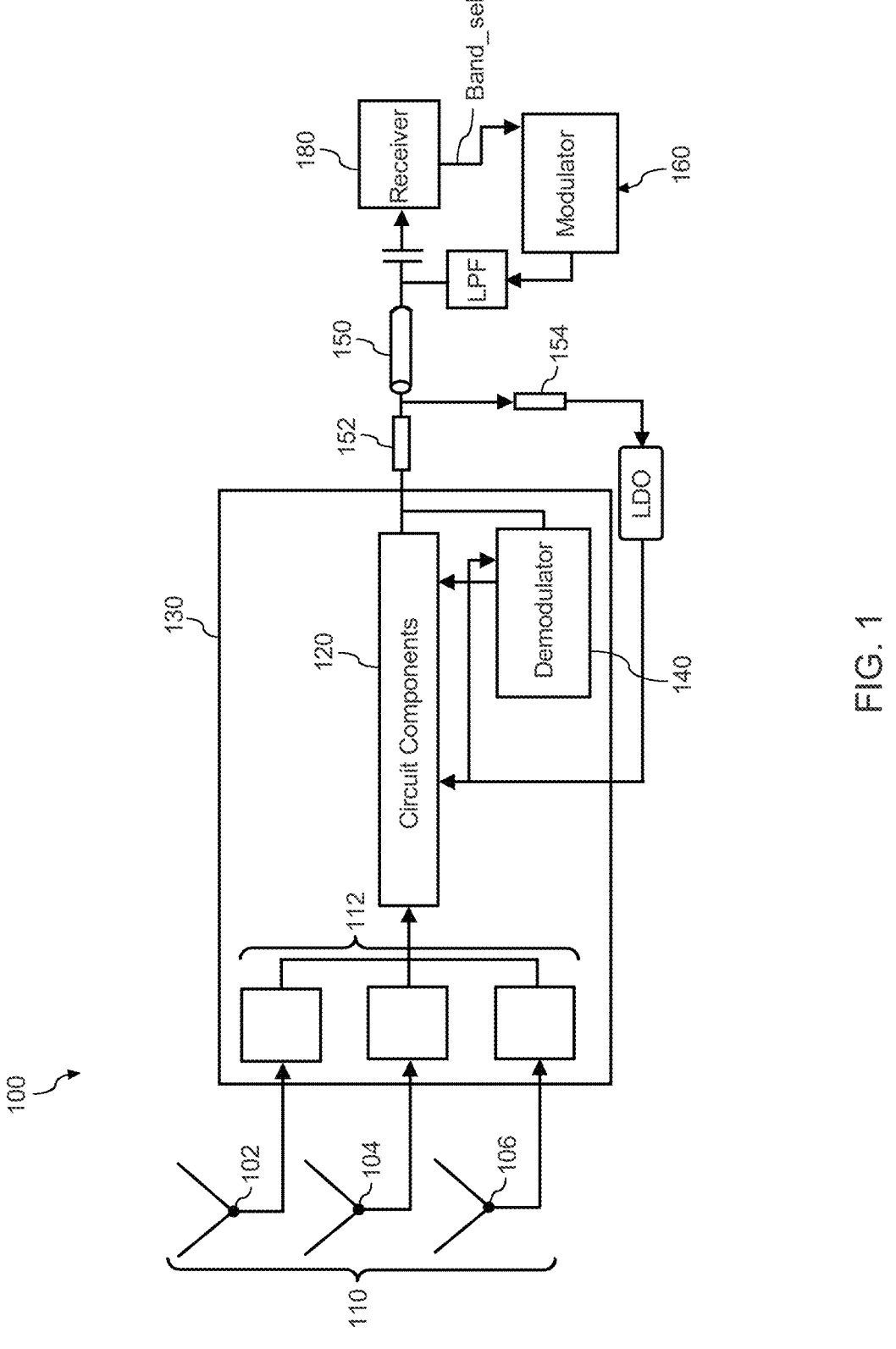
FIG. 1 illustrates a schematic diagram of an example antenna system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to antenna systems. Antenna systems configured for GNSS applications can include an antenna for receiving GNSS signals, an antenna circuit, and a transceiver. The antenna circuit may include a low noise amplifier (LNA) paired with a matching circuit(s) configured for improved noise performance at a particular frequency band. The matching circuits are highly frequency selective to suppress adjacent interferences and to achieve improved noise performance. In applications where the antenna system is configured to receive GNSS signals transmitted at more than one frequency band, the LNA integrated in the antenna system may require different matching circuits for each of the frequency bands to achieve the best noise performance. In some high-performance GNSS applications, the antenna circuit may include, for instance, three or more sets of LNAs and matching circuits for different frequency bands associated with GNSS signals.

Antenna systems according to example aspects of the present disclosure can include an antenna that is operable in a selected frequency band of a plurality of frequency bands. For instance, the antenna can be operable in a selected frequency band associated with a GNSS frequency band.

The antenna system can include an antenna circuit and a transmission line coupled to the antenna circuit. The antenna circuit can comprise an RF communication path and one or more configurable elements in the RF communication path. An RF signal associated with a selected frequency can be provided to the RF communication path.

The antenna system can include a control unit coupled to transceiver of the antenna system. The transceiver can be configured to communicate a band-selection signal associated with the selected frequency band to the control unit. The control unit can modulate a control signal onto an RF signal to generate a transmit signal for communication over the transmission line to the antenna circuit. The control signal can be based at least in part on the band-selection signal. The antenna circuit can be configured to demodulate the control signal from the transmit signal communicated over the transmission line to adjust the one or more configurable elements in the RF communication path. For instance, the antenna circuit can adjust the one or more configurable elements in the RF communication path based at least in part on the control signal to configure the RF communication path to operate in the selected frequency band.

In some embodiments, the antenna system comprises a plurality of antennas, and each antenna of the plurality of antennas can be operable over one of the plurality of frequency bands. The antenna circuit can have a multiplexer coupled between the plurality of antennas and the RF communication path. For instance, the multiplexer can be configured to provide a bandpass response in the selected frequency band and provide an RF signal to the RF communication path.

In some embodiments, the antenna comprises a multiband antenna that is operable over the plurality of frequency bands. In such instances, the one or more configurable elements in the RF communication path can include a first bandpass filter that is coupled to the multiband antenna. The first bandpass filter can be configurable (e.g., adjusted based at least in part on the control signal) to provide a bandpass response in the selected frequency band. Further, the bandpass filter can be configurable to provide the RF signal to the RF communication path.

In some embodiments, the antenna system comprises a DC filter and RF filter located between the antenna circuit and the control unit. The DC filter can be configured to pass an unregulated DC signal that is transmitted with the transmit signal. The RF filter may be configured to pass an RF signal transmitted with the transmit signal. In some embodiments, the antenna system can comprise a low dropout regulator that is configured to convert the unregulated DC signal into a regulated DC signal. In such instances, a low noise amplifier of the antenna circuit and the demodulation circuit of the antenna circuit can be configured to be powered by the regulated DC signal.

In some embodiments, the control unit can be coupled to a transceiver. The transceiver may be able to communicate a band-selection signal associated with the selected frequency band to the control unit. The transceiver can also be coupled to the antenna circuit via the transmission line and thus configured to communicate the RF signal provided through the RF communication path and the transmission line. In some embodiments, the control unit is configured to generate the control signal based at least in part on the band-selection signal.

In some embodiments, the selected frequency band of the plurality of frequency bands can be associated with a GNSS frequency band. For example, the selected frequency band can include at least one of a first frequency range of about 1,160 MHz to about 1,214 MHz, a second frequency range of about 1,215 MHz to about 1,300 MHz, or a third frequency range of about 1,550 MHz to about 1,610 MHz.

Another example embodiment of the present disclosure is directed to a method for controlling a modal antenna. The method may include modulating, at a control unit, a control signal onto an RF signal to generate a transmit signal. The method may include communicating the transmit signal via a transmission line to an antenna circuit coupled between the control unit and an antenna of the antenna system. The method can include demodulating, at the antenna circuit, the control signal from the transmit signal and adjusting one or more configurable elements in an RF communication path of the antenna circuit based on the control signal. The method includes controlling, from the control unit, the RF communication path of the antenna circuit to operate in a selected frequency band via the control signal. The antenna may be operable in the selected frequency band of a plurality of frequency bands.

In some embodiments, the one or more configurable elements are adjusted based on the control signal to provide a bandpass response in the selected frequency band. For instance, the method can include adjusting one or more configurable elements including at least one input matching network, at least one output matching network, and at least one bandpass filter.

The method can include encoding, at the control unit, a plurality of bits associated with a frame of the control signal with the selected frequency band in accordance with a coding scheme. The coding scheme can specify a unique code for each of the plurality of frequency bands. The method can include modulating, at the control unit, the control signal onto the RF signal to generate the transmit signal. The transmit signal can be communicated to the antenna circuit via the transmission line. The method may include demodulating, at a demodulation circuit of the antenna circuit, the control signal from the transmit signal and processing the frame of the control signal to obtain a first code associated with the frame. The method may include determining whether the first code matches the unique code for one of the plurality of frequency bands in which the antenna is operable. For example, the method may include determining that the first code matches the unique code for one of the plurality of frequency bands. In response, the method may include controlling the one or more configurable elements in the RF communication path based at least in part on the control signal to configure the RF communication path to operate in the selected frequency band. In some embodiments, the method may include determining the first code does not match the unique code for one of the plurality of frequency bands in which the antenna is operable. In response, the method may include determining an error exists in the control signal.

Another example embodiment of the present disclosure is directed to an antenna system comprising an antenna that is configured to receive GNSS signals from one or more GNSS satellites. The antenna can be operable in a selected frequency band associated with the GNSS signals. In some embodiments, the antenna can be a plurality of antennas each configured in a selected frequency band. In some embodiments, the antenna can be a multiband antenna configured to operate in a plurality of frequency bands associated with the GNSS signals.

Aspects of the present disclosure provide technical effects and benefits. For instance, employing an antenna system that combines the LNA and matching circuits for different frequency bands into one communication path may provide several benefits. For example, the control signal may be transmitted (as part of the transmit signal) via the same transmission line used by the antenna system for communicating GNSS signals to the receiver of the antenna circuit. Further, the GNSS signals can be associated with one of multiple single-band antennas or a multi-band antenna configured for different frequency bands. This may reduce the number of RF signal paths, matching circuits, amplifiers, and other components required for operation of the antenna system. In this way, configuring the antenna circuit to demodulate the control signal such that the components of the matching circuit can be configured according to the frequency band allows for the reduction of components.

FIG. 1 illustrates a schematic diagram of an example antenna system 100 according to example embodiments of the present disclosure. The antenna system 100 may include an antenna 110. The antenna 110 can be operable in a selected frequency band of a plurality of frequency bands, for example as described below with reference to FIG. 10. The antenna system 100 may include an antenna circuit 130 having an RF communication path 120 and a demodulation circuit 140. A transmission line 150 may be coupled to the antenna circuit 130. The antenna system 100 may comprise a control unit 160 configured to communicate a transmit signal over the transmission line 150 to the antenna circuit 130. A transceiver 180 can be coupled to the control unit 160 and configured to communicate an RF signal over the transmission line 150 and the RF communication path 120.

As shown in FIG. 1, the antenna 110 can be a plurality of antennas, such as first antenna 102, a second antenna 104, and a third antenna 106. The antenna 110 is operable in a selected frequency band of a plurality of frequency bands with each antenna of the plurality of antennas being configured to operate in one of the plurality of frequency bands. For instance, the first antenna 102 can be operable over a first frequency band, the second antenna 104 can be operable over a second frequency band, and the third antenna 106 can be operable over a third frequency band.

In some embodiments, the selected frequency band is associated with the GNSS frequency bands, such as in GNSS applications. The selected frequency band can have a frequency range. For example, the first antenna 102 can be operable in a first frequency band having a first frequency range of about 1,160 MHz to about 1,214 MHz. The second antenna 104 can be operable in a second frequency band having a second frequency range of about 1,215 MHz to about 1,300 MHz. The third antenna 106 can be operable in a third frequency band having a third frequency range of about 1,550 MHz to about 1,610 MHz. For instance, when the antenna system 100 receives a signal, such as a GPS signal, transmitted within the first frequency band, the antenna 110 can be operable in the selected frequency band (e.g., first frequency band) via the first antenna 102.

A multiplexer 112 (e.g., a triplexer) can be coupled between the antenna 110 and the RF communication path 120. The multiplexer 112 can provide a bandpass response in the selected frequency band and provide an RF signal to the RF communication path 120. The RF signal can be associated with any GNSS signal, such as GPS, Galileo, Glonass, or Beidou signals. The selected frequency band can be the first frequency band, for instance, over which the antenna 110 is operable via the first antenna 102. The multiplexer 112 can block frequency bands that are higher than or outside of the frequency range associated with the first frequency band. As such, the multiplexer 112 may isolate the frequency of the transmitted signal. In this way, the signal can be provided to the RF communication path 120 as the RF signal.

In some embodiments, the antenna circuit 130 may include an RF communication path 120 and one or more configurable elements in the RF communication path 120, such as matching networks and bandpass filters. The RF communication path 120 can be configured to operate in the selected frequency band. For instance, the antenna circuit 130 can be configured to demodulate a control signal from a transmit signal and adjust the one or more configurable elements based on the control signal. The transmit signal can be communicated over the transmission line 150. In some embodiments, the antenna circuit 130 may include a demodulation circuit 140 configured to demodulate the control signal such that the RF communication path 120 can be controlled via the control signal. In some embodiments, the RF communication path 120 can also include a low-noise amplifier (LNA), as discussed below with reference to FIG. 4.

In some embodiments, a control unit 160 may be configured to communicate the transmit signal to the antenna circuit 130. For example, the transmission line 150 may couple the control unit 160 to the antenna circuit 130. In some embodiments, the transmission line 150 may be a coaxial cable. The control unit 160 may be configured to modulate the control signal onto an RF signal to generate the transmit signal for communication over the transmission line 150 to the antenna circuit 130. The control unit 160 may use amplitude-shift keying modulation to generate the transmit signal. An unregulated DC signal may be transmitted with the transmit signal over the transmission line 150.

A transceiver 180 may be coupled to the control unit 160. The transceiver 180 can be configured to communicate a band-selection signal ("Band_sel") associated with the selected frequency band to the control unit 160. The transceiver 180 can be coupled to the antenna circuit 130 via the transmission line 150. The transceiver 180 can be configured to communicate the RF signal provided via the RF communication path 120 and the transmission line 150. The transceiver 180 may be associated with a number of devices configured for use in a GNSS system. For example, the transceiver 180 may be a GPS receiver configured to communicate an RF signal associated with a GPS signal.

The transmission line 150 may be coupled with various components that are configured to aid in the combination and/or separation of signals occupying various frequency bands. For example, the antenna circuit 130 may include a DC filter 154 and an RF filter 152 disposed between the antenna circuit 130 and the control unit 160. The DC filter 154 may be configured to pass the unregulated DC signal transmitted with the transmit signal. The RF filter 152 may be configured to pass the RF signal and the control signal transmitted with the transmit signal. The antenna circuit 130 may include a low pass filter ("LPF") and a low dropout regulator ("LDO"). For example, the low pass filter may be configured to filter at least one frequency band that is higher than the frequency of the RF signal transmitted with the transmit signal. The transmit signal may be communicated over the transmission line 150. The RF signal and control signal transmitted with the transmit signal may pass through the RF filter 152 to the antenna circuit 130. For example, the control signal may be communicated to the demodulation circuit 140 of the antenna circuit 130.

The low dropout regulator ("LDO") may be configured to convert the unregulated DC signal into a regulated DC signal. For instance, the transmit signal may be communicated over the transmission line 150, and the unregulated DC signal transmitted with the transmit signal may pass through the DC filter. The low dropout regulator may be configured to convert the unregulated DC signal into a regulated DC signal. A regulated DC signal can be a DC signal that has a specific regulated voltage and/or current, such as about 5 V. The regulated DC signal may be provided to antenna circuit 130 to supply power. For instance, the regulated DC signal may be provided to the demodulation circuit 140 of the antenna circuit 130 to supply power. The regulated DC signal may be provided to a low noise amplifier of the RF communication path 120 to supply the low noise amplifier with power, as described below with reference to FIG. 4.

The transmission line 150 may be a coaxial cable configured to allow for the communication of the transmit signal to the antenna circuit 130 and for the communication of the RF signal to the transceiver 180. In this way, the control signal used to configure the RF communication path 120 can be sent via the same coaxial cable used to carry the RF signal.

The demodulation circuit 140 may be configured to adjust the one or more configurable elements in the RF communication path 120 to configure the RF communication path 120 to operate in the selected frequency band. The demodulation circuit 140 may be configured to demodulate the control signal from the transmit signal and control the one or more configurable elements based on the control signal.

Figure 2:
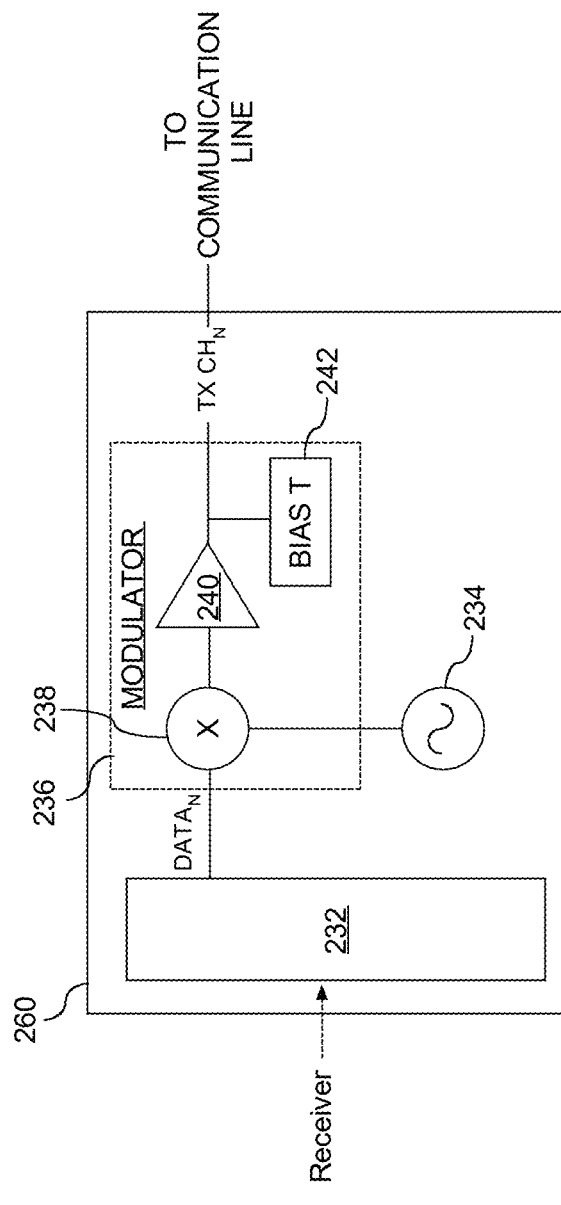
FIG. 2 illustrates a schematic diagram of an example control unit of the antenna system according to example embodiments of the present disclosure.

FIG. 2 illustrates a schematic diagram of one embodiment of the control unit 160 of the antenna system 100 illustrated in FIG. 1. With reference to FIG. 2, the control unit 260 may include a processor 232 or control logic, and the processor 232 or control logic may be configured to generate or receive control instructions (e.g., band-selection signal "Band_sel") for controlling the RF communication path 120 (illustrated in FIG. 1), or otherwise adjusting the one or more configurable elements of the RF communication path 120. For example, the processor 232 may receive the control instructions as a band-selection signal communicated from the transceiver 180 (represented by "Receiver" in FIG. 1) and may generate an output that contains data (represented by DATAN in FIG. 2) that describes the instructions. The data may have any suitable bit depth. For example, in some embodiments the data may be in binary format. In other embodiments, the data may be in hexadecimal format, decimal format, etc. As will be discussed in detail below, the data can be encoded with a coding scheme that increases error detection according to example embodiments of the present disclosure.

The control unit 260 may also include a carrier signal source 234. In some embodiments, the carrier signal source 234 may be configured to generate a carrier signal that includes a sinusoidal wave, which may have a generally constant frequency. In other embodiments, the carrier signal may be or include any suitable signal. For example, in some embodiments, the carrier signal may be or include any suitable repeating pattern, and is not limited to being sinusoidal or having a generally constant frequency.

The control unit 260 may also include a modulator 236 that is configured to modulate the output of the processor 232 onto the carrier signal to produce the control signal (represented by TX CH$_N$ in FIG. 2). The modulator 136 may include a multiplexer 238 that is configured to combine the output containing the data (represented by DATAN in FIG. 2), which may describe the control instructions, with the carrier signal from the carrier signal source 234. For example, the modulator 236 may be configured to scale the amplitude of the carrier signal from the carrier signal source

234 to produce the control signal, for example by performing amplitude shift keying modulation (e.g., on-off keying modulation), for example as described in greater detail below with reference to FIG. 3. The modulator 236 may also include an amplifier 240 and a Bias T circuit 242.

Figure 3:
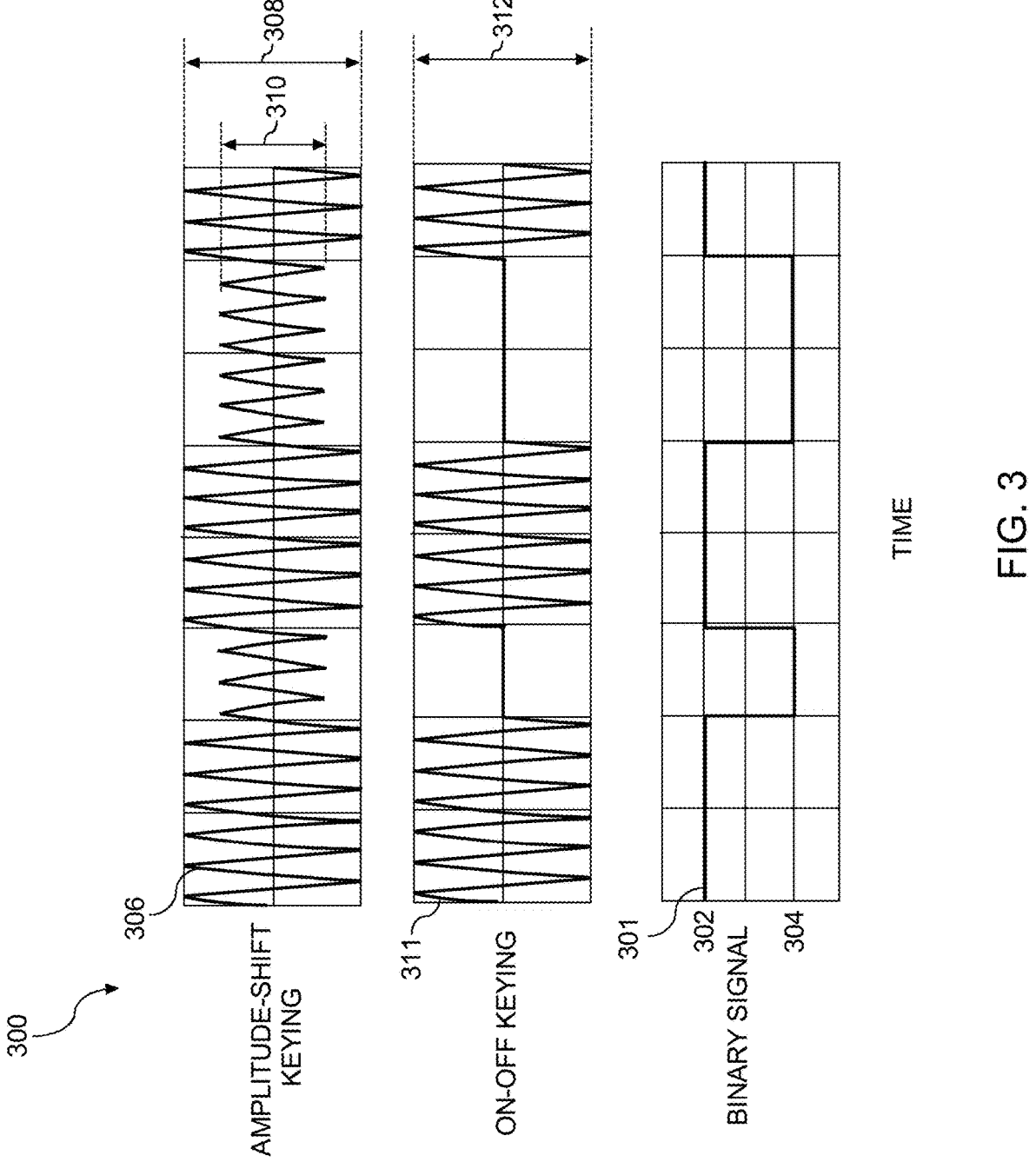
FIG. 3 illustrates a series of time-aligned charts representing simplified examples of amplitude-shift keying modulation and on-off keying modulation.

FIG. 3 illustrates a series of time-aligned charts 300 representing simplified examples of amplitude-shift keying modulation and on-off keying modulation. A binary signal 301 can alternate between a first voltage level 302 and a second voltage level 304 in a manner that describes the binary data set. The binary signal 301 can correspond to a simplified example of the output of processor 232, which can contain the data describing the control instructions communicated via the band-selection signal, for example as described above with reference to FIG. 2. Amplitude-shift keying modulation can include representing the binary signal 301 by representing the first voltage level 302 as a sinusoidal signal 306 having a varying amplitude. For example, the sinusoidal signal 306 can have a first amplitude 308 that represents the first voltage 302 of the binary signal 301, and can have a second amplitude 310 that represents the second voltage level 304 of the binary signal 301.

On-off keying modulation is a type of amplitude-shift keying modulation. In on-off keying modulation, the binary signal 301 can be represented by a sinusoidal signal 311 having a varying amplitude. The sinusoidal signal 311 can have a first amplitude 312 that represents the first voltage level 302 of the binary signal 301. However, the second voltage level 304 can be represented by an absence of the sinusoidal signal 311. In other words, the sinusoidal signal 311 can have an amplitude of about zero to represent the second voltage 304 of the binary signal 301.

Figure 4:
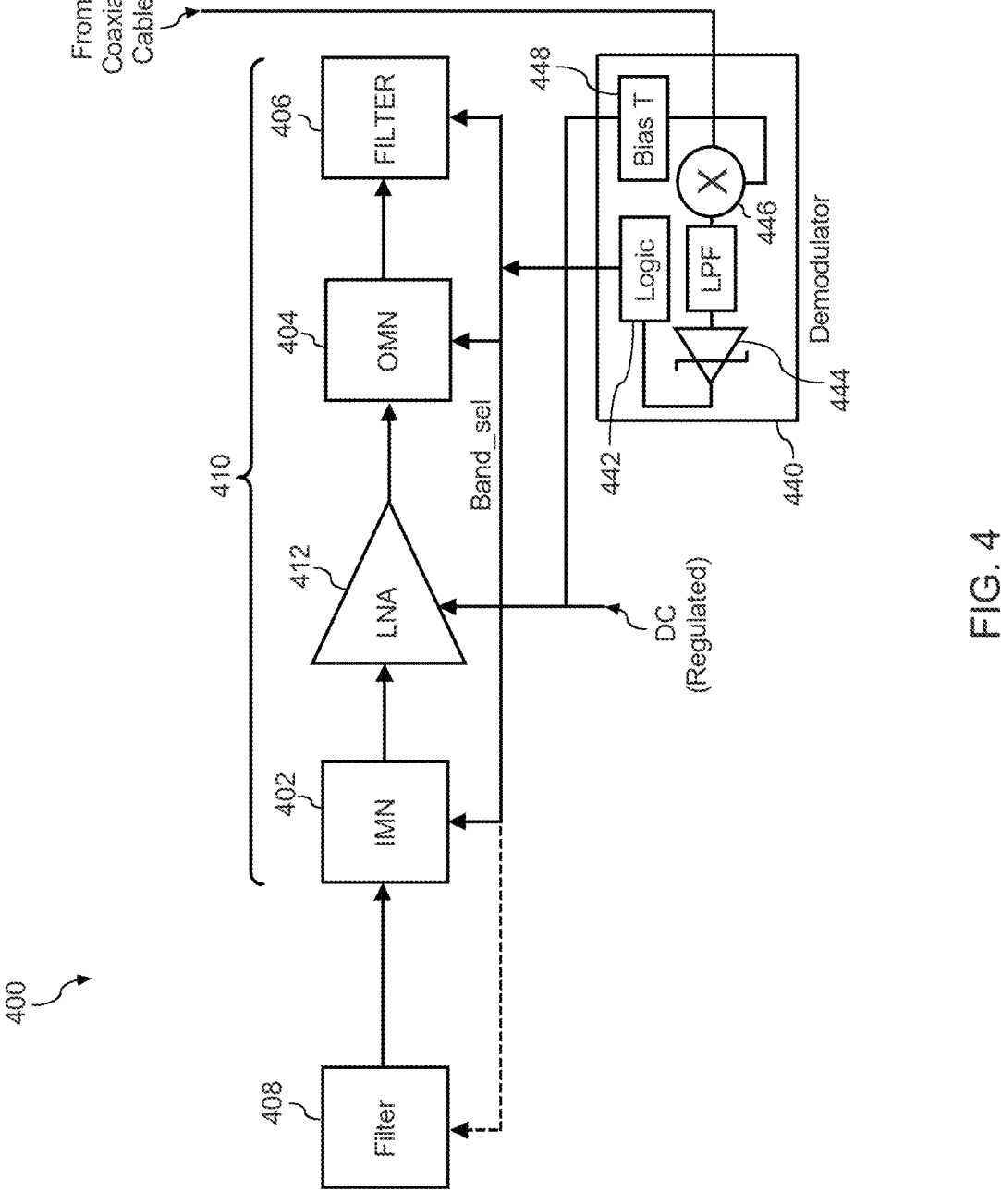
FIG. 4 illustrates a schematic diagram of an example antenna circuit according to example embodiments of the present disclosure.

FIG. 4 illustrates a schematic diagram of an example antenna circuit 400, for example corresponding to the antenna circuit 130 discussed above with reference to FIG. 1, in accordance with aspects of the present disclosure. The antenna circuit 400 includes a demodulation circuit 440. The demodulation circuit 440 can include a Bias T circuit 448, a logic circuit 442, and a multiplexer 446 that is coupled with the transmission line 150 (illustrated in FIG. 1).

The demodulation circuit 440 can also include a low pass filter that is configured to block at least one frequency band. For example, the low pass filter can be configured to block at least one frequency band that is higher than the frequency of the RF signal (e.g., carrier signal) transmitted with the transmit signal. As such, the low pass filter can isolate the carrier signal frequency. The demodulation circuit 440 can also include a diode, such as a Zener diode. The diode 444 can be coupled with a logic circuit 442 that is configured to interpret the control instructions associated with (e.g., contained within) the control signal. The logic circuit 442 can also be configured to perform error detection. Example techniques implemented by the logic circuit 442 will be discussed with reference to FIGS. 7-16.

The logic circuit 442 (e.g., processors, ASICS, etc. configured to execute computer-readable instructions to implement logic operations), as part of the demodulation circuit 440, can also be configured to control the operation of one or more configurable elements in an RF communication path 410 based on the control instructions associated with (e.g., contained within) the control signal. The demodulation circuit 440 can demodulate the control signal from the transmit signal received at the multiplexer 446 and determine, via the logic circuit 442, a selected frequency band over which the RF communication path 410 should be configured to operate. The demodulation can adjust the one or more configurable elements in the RF communication path 410 based on the control signal to configure the RF communication path 410 to operate in the selected frequency band. For example, the demodulation circuit 440 can determine that the selected frequency band is a first frequency band. The demodulation circuit 440 can adjust the input matching network 402, the output matching network 404, and the bandpass filter 406 to operate in the first frequency band. The low noise amplifier and the demodulation circuit 440 can be powered by a regulated DC signal.

The antenna circuit 400 can include an RF communication path 410. The RF communication path 410 can include one or more configurable elements and a low noise amplifier. The one or more configurable elements in the RF communication path 410 can include an input matching network 402, an output matching network 404 and a bandpass filter 406. The RF communication path 410 can be coupled to a filter 408 at a first end and the transmission line at a second end, as shown in FIG. 1 for example.

In some embodiments, the filter 408 is a multiplexer, as depicted in FIG. 1 for example. The filter can be coupled between a plurality of antennas of the antenna system and the RF communication path 410. The filter 408 can provide a bandpass response in a selected frequency band and provide an RF signal to the RF communication path 410. The filter 408 can block frequency bands that are higher than, less than, or otherwise outside of the frequency range associated with the selected frequency band.

In some embodiments, the filter 408 can be a first bandpass filter in the RF communication path 410, such that the RF communication path 410 comprises filter 408. For example, the antenna system may comprise an antenna that is a multiband antenna operable over a plurality of frequency bands, as discussed below with reference to FIG. 5 for example. The one or more configurable elements in the RF communication path 410 may comprise filter 408. The demodulation circuit 440 may configure the filter 408 to provide a bandpass response in the selected frequency band, and the filter 408 may provide an RF signal to the RF communication path 410.

Figure 5:
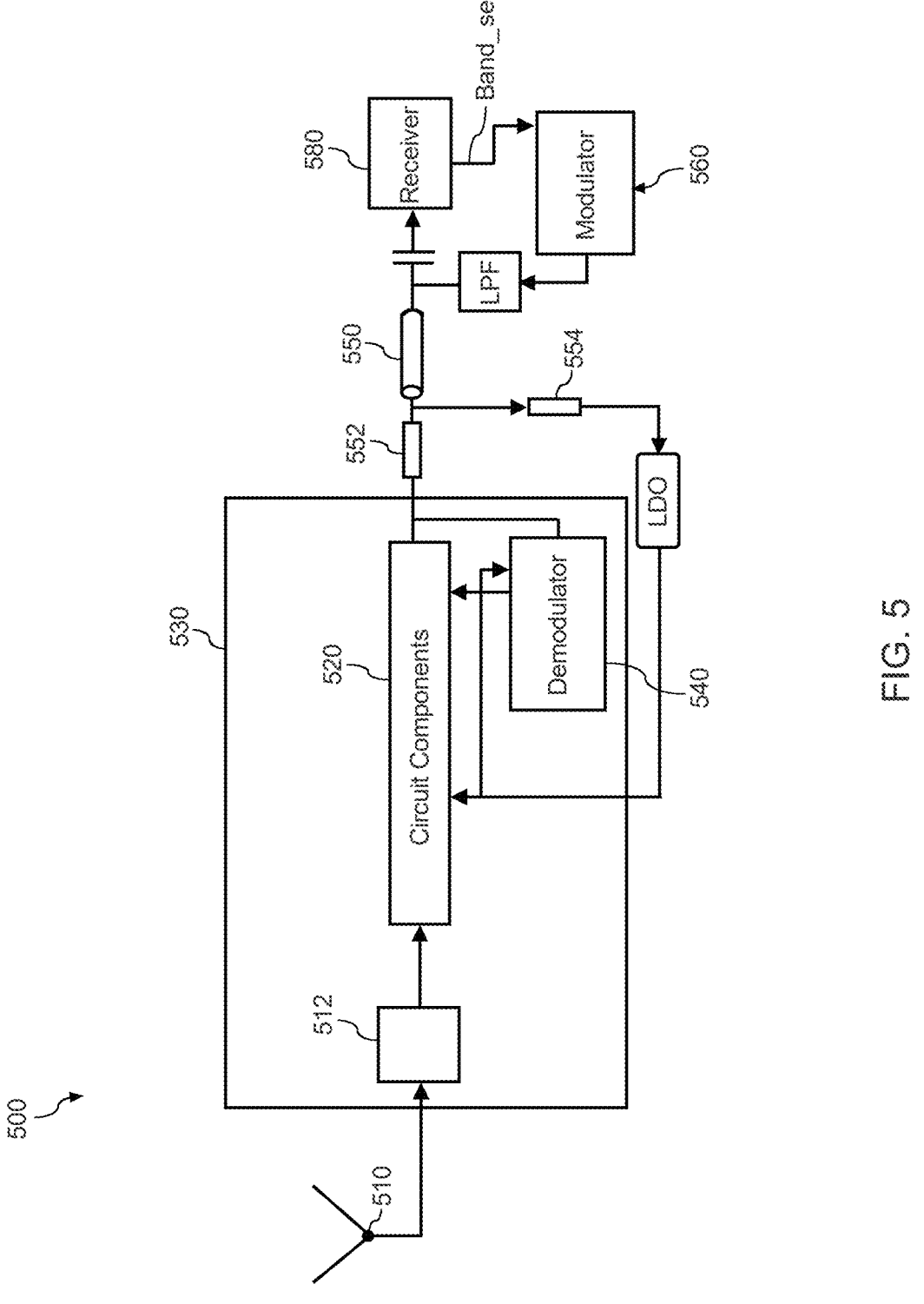
FIG. 5 illustrates a schematic diagram of an example antenna system according to example embodiments of the present disclosure.

FIG. 5 illustrates a schematic diagram of an example antenna system 500, similar to the antenna system 100 of FIG. 1, according to example embodiments of the present disclosure. The antenna system 500 may include an antenna 510. The antenna 510 can be operable in a selected frequency band of a plurality of frequency bands, for example as described below with reference to FIG. 10. The antenna system 500 may include an antenna circuit 530 having an RF communication path 520 and a demodulation circuit 540, similar to the antenna circuit 130 of FIG. 1. A transmission line 550 may be coupled to the antenna circuit 530. The antenna system 500 may comprise a control unit 560 configured to communicate a transmit signal over the transmission line 550 to the antenna circuit 530. A transceiver 580 can be coupled to the control unit 560 and configured to communicate an RF signal over the transmission line 550 and the RF communication path 520.

As shown in FIG. 5, the antenna 510 can be a single multiband antenna that is operable over the plurality of frequency bands. For instance, the antenna 510 can be operable over a first frequency band, a second frequency band, and a third frequency band. In some embodiments, the selected frequency band is associated with the GNSS frequency bands, such as in GNSS applications. The antenna 510 can be a modal antenna.

The selected frequency band can have a frequency range. For example, the antenna 510 can be operable in the first frequency band having a first frequency range of about 1,160

MHz to about 1,214 MHz. The antenna 510 can be operable in the second frequency band having a second frequency range of about 1,215 MHz to about 1,300 MHz. The antenna 510 can be operable in the third frequency band having a third frequency range of about 1,550 MHz to about 1,610 MHz. For instance, when the antenna system 500 receives a signal, such as a GPS signal, transmitted at a frequency within the first frequency range, the antenna 510 can be operable in the selected frequency band by being configured in the first frequency band.

In some embodiments, the antenna circuit 530 may include an RF communication path 520 and one or more configurable elements in the RF communication path 520, such as matching networks and bandpass filters. The RF communication path 520 can be configured to operate in the selected frequency band. For instance, the antenna circuit 530 can be configured to demodulate a control signal from a transmit signal and adjust the one or more configurable elements based on the control signal. The transmit signal can be communicated over the transmission line 550. In some embodiments, the antenna circuit 530 may include a demodulation circuit 540 configured to demodulate the control signal such that the RF communication path 520 can be controlled via the control signal. In some embodiments, the RF communication path 520 can also include a low-noise amplifier (LNA).

In some embodiments, the RF communication path 520 can include a configurable bandpass filter 512 coupled to the antenna 510. The configurable bandpass filter 512 can provide a bandpass response in the selected frequency band and provide an RF signal to the RF communication path 520. For example, the selected frequency band can be the first frequency band over which the antenna 510 is operable. The configurable bandpass filter 512 can block frequency bands that are higher than or outside of the frequency range associated with the first frequency band. As such, the configurable bandpass filter 512 may isolate the frequency of the transmitted signal. In this way, the signal can be provided to the RF communication path 520 as the RF signal.

A control unit 560 may be configured to communicate the transmit signal to the antenna circuit 530. For example, the transmission line 550 may couple the control unit 560 to the antenna circuit 530. In some embodiments, the transmission line 550 may be a coaxial cable. The control unit 560 may be configured to modulate the control signal onto an RF signal to generate the transmit signal for communication over the transmission line 550 to the antenna circuit 530. The control unit 560 may use amplitude-shift keying modulation to generate the transmit signal. An unregulated DC signal may be transmitted with the transmit signal over the transmission line 550.

A transceiver 580 may be coupled to the control unit 560. The transceiver 580 can be configured to communicate a band-selection signal ("Band_sel") associated with the selected frequency band to the control unit 560. The transceiver 580 can be coupled to the antenna circuit 530 via the transmission line 550. The transceiver 580 can be configured to communicate the RF signal provided via the RF communication path 520 and the transmission line 550.

The transmission line 550 may be coupled with various components that are configured to aid in the combination and/or separation of signals occupying various frequency bands. For example, the antenna circuit 530 may include a DC filter 554 and an RF filter 552 disposed between the antenna circuit and the control unit 560. The DC filter 554 may be configured to pass the unregulated DC signal transmitted with the transmit signal. The RF filter 552 may be configured to pass the RF signal and the control signal transmitted with the transmit signal. The antenna circuit 530 may include a low pass filter ("LPF") and a low dropout regulator ("LDO"). For example, the low pass filter may be configured to block at least one frequency band that is higher than the frequency of the RF signal transmitted with the transmit signal. The low dropout regulator ("LDO") may be configured to convert the unregulated DC signal into a regulated DC signal. The regulated DC signal may be provided to antenna circuit 530 to supply power. For instance, the regulated DC signal may be provided to the demodulation circuit 540 of the antenna circuit 530 to supply power. The regulated DC signal may be provided to a low noise amplifier of the RF communication path 520 to supply the low noise amplifier with power.

The transmission line 550 may be a coaxial cable configured to allow for the communication of the transmit signal to the antenna circuit 530 and for the communication of the RF signal to the transceiver 580. In this way, the control signal used to configure the RF communication path 520 can be sent via the same coaxial cable used to carry the RF signal. Additionally, but using a single multiband antenna, the antenna system 500 can be operable over a plurality of frequency bands while reducing the number of transmission lines, the number of antennas, and the number of sets of RF communication paths.

The control signal can be implemented in one or more frames. Each frame can include a plurality of bits. The frame(s) can specify a selected frequency band of the plurality of frequency bands for operation of the RF communication path. The control signal (e.g., instructions) can be encoded with a coding scheme that increases error detection by the demodulation circuit 540. For instance, the coding scheme can assign a unique code to each frequency band of the plurality of frequency bands. The control unit can be configured to encode the plurality of bits associated with the selected frequency band in accordance with the coding scheme. The coding scheme can specify a unique code for each of the plurality of frequency bands in which the antenna is operable.

In some embodiments, the unique code can be encoded using 11 bits or more (e.g., 11 bits, 21 bits). The unique code for each frequency band can differ by at least two bits relative to the unique code for each other frequency band of the plurality of frequency bands, such as by at least three bits, such as by at least four bits, such as by at least five bits, such as by at least six bits, such as by at least seven bits, such as by at least eight bits, etc. As a result, the unique code for each frequency band of the plurality of frequency bands is separated a significant distance (e.g., in terms of binary code) from the unique code for each of the other frequency bands. The antenna circuit is configured to process the frame to obtain a first code associated with the frame. The antenna circuit is configured to determine whether the first code matches the unique code for one of the plurality of frequency bands in which the antenna is operable. By encoding the unique code using 11 bits or more, the accuracy with which the antenna determines whether the first code matches the unique code can be improved.

Figure 6:
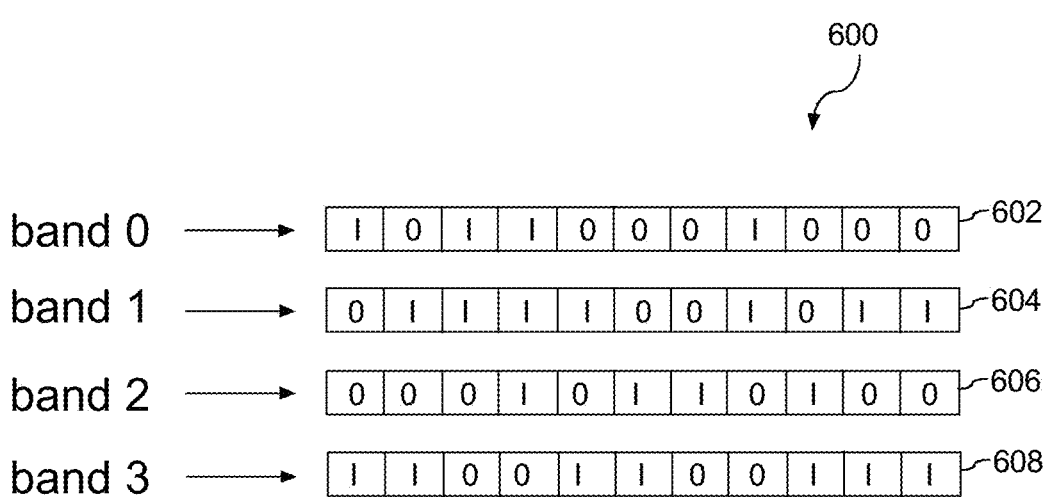
FIG. 6 depicts an example coding scheme for a plurality of antenna modes according to example embodiments of the present disclosure.

For instance, FIG. 6 depicts an example coding scheme 600 according to example embodiments of the present disclosure. The coding scheme 600 assigns unique 11-bit codes to each of four different frequency bands: band 0, band 1, band 2, and band 3. More particularly, code 602 is assigned to band 0. Code 604 is assigned to band 1. Code 606 is assigned to band 2. Code 608 is assigned to band 3.

Aspects of the present disclosure are discussed with reference to four frequency bands for purposes of illustration and discussion. Those of ordinary skill in the art, using the disclosures provided herein, will understand that any number of frequency bands can be used without deviating from the scope of the present disclosure, such as 2 frequency bands, 6 frequency bands, 12 frequency bands, etc. In addition, aspects of the present disclosure are discussed with reference to unique codes implemented in binary format. Those of ordinary skill in the art, using the disclosures provided herein, will understand that other numerical schemes can be used (e.g., decimal, hexadecimal) without deviating from the scope of the present disclosure.

Referring to FIG. 6, the codes 602, 604, 606, and 608 in the coding scheme 600 differ by at least two bits, such as by at least five bits relative to each other. As a result, the codes 8602, 604, 606, and 608 are separated a significant distance from each other. This facilitates error detection as discussed below.

Figure 7:
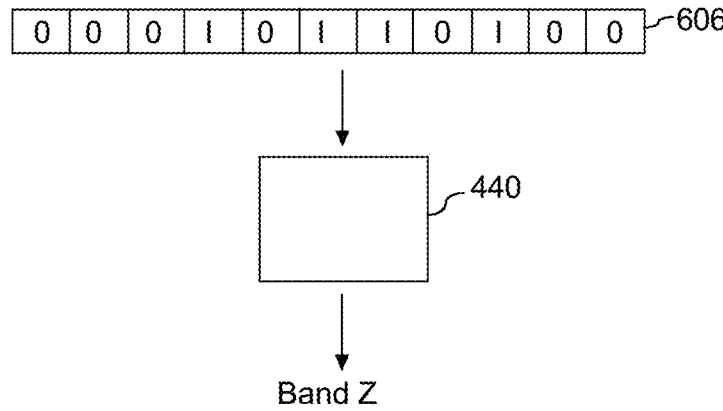
FIG. 7 depicts example control of a modal antenna according to example embodiments of the present disclosure.

FIG. 7 depicts a demodulation circuit 440 as illustrated in FIG. 4 by way of example, although the demodulation circuit 140 of FIG. 1 may also be suitable. The demodulation circuit 440 of FIG. 7 is depicted processing a plurality of bits in the frame(s) received over the transmission line. The demodulation circuit 440 can process the bits and determine that the bits match unique code 606. As a result, the demodulation circuit 440 can determine that the control signal has control instructions to operate the RF communication path in frequency band 2. In some embodiments, the demodulation circuit 440 may comprise a logic circuit configured to carry out such operations described with reference to FIG. 7. In some embodiments, the antenna circuit 400 (e.g., demodulation circuit 440) is configured to process the frame to obtain a first code associated with the frame. The antenna circuit 400 can be configured to determine whether the first code matches the unique code for one of the plurality of frequency bands in which the antenna is operable.

Figure 8:
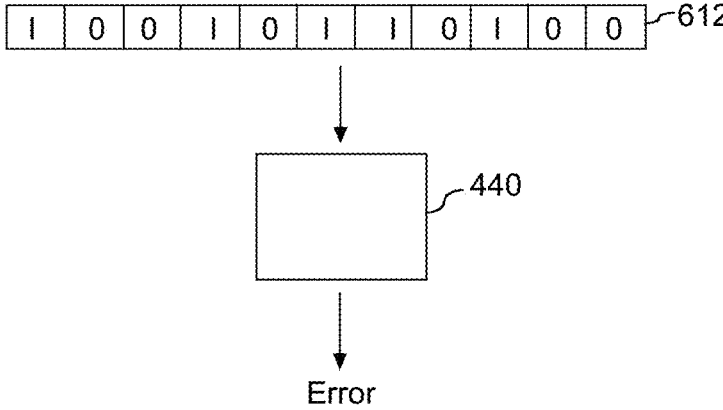
FIG. 8 depicts example error detection according to example embodiments of the present disclosure.

FIG. 8 depicts a demodulation circuit 440 as illustrated in FIG. 4 by way of example, although the demodulation circuit 140 of FIG. 1 may also be suitable. The demodulation circuit 440 of FIG. 8 is depicted processing a plurality of bits in the frame(s) received over the transmission line. The plurality of bits 612 differ from unique code 606 by only one bit. However, because the plurality of bits 612 do not match a unique code in the coding scheme 600, the demodulation circuit 440 can easily detect an error-despite only one bit being incorrect. This error detection is facilitated by the unique codes in the coding scheme being separated a significant distance to reduce errors matching with other unique codes. In some embodiments, the demodulation circuit 440 may comprise a logic circuit configured to carry out such operations described with reference to FIG. 7.

Figure 9:
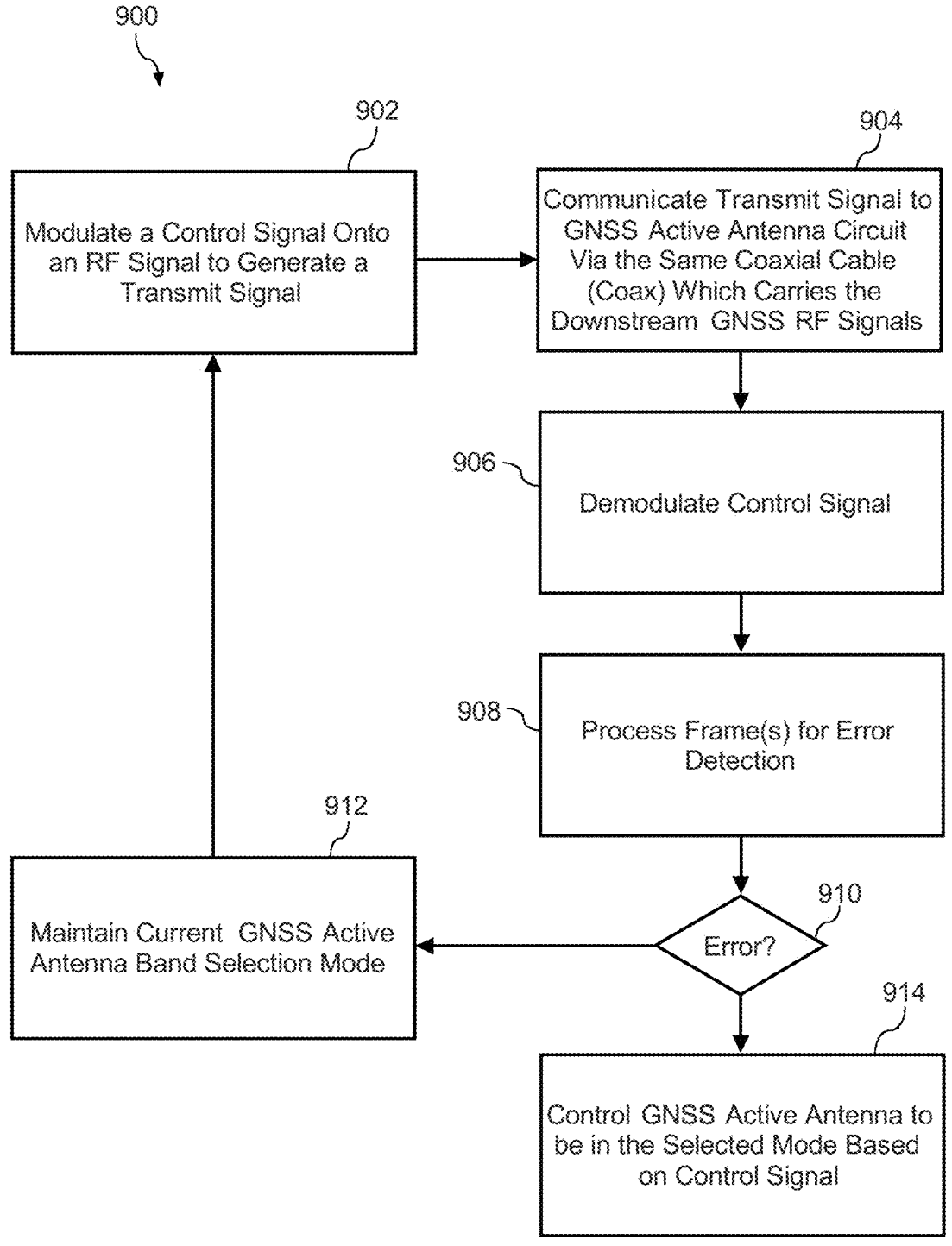
FIG. 9 depicts a flow diagram of an example method according to example embodiments of the present disclosure.

FIG. 9 depicts a flow diagram of an example method 900 according to example embodiments of the present disclosure. FIG. 9 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 900 is generally discussed with reference to the antenna systems 100, 500 described above with reference to FIGS. 1 and 5. However, it should be understood that aspects of the present method 900 can find application with any suitable antenna system including an antenna.

The method 900 can include, at (902), modulating a control signal onto an RF signal to generate a transmit signal. For example, the control signal can be based at least in part on a band selection signal transmitted to a control unit 560 from a transceiver 580. The band selection signal can be associated with a selected frequency band. In this way, the control signal can contain control instructions for operating an RF communication path of an antenna circuit or otherwise adjusting one or more configurable elements in the RF communication path. For example, the control unit 560 can be configured to modulate the control signal onto the RF signal to generate a transmit signal, for example as described above with reference to FIGS. 2 and 3.

The control signal can be implemented in one or more frames. Each frame can include a plurality of bits. The frame(s) can specify a selected frequency band of the plurality of frequency bands for operation of the RF communication path. The control signal (e.g., instructions) can be encoded with a coding scheme that increases error detection by the demodulation circuit. For instance, the coding scheme can assign a unique code to each frequency band of the plurality of frequency bands.

In some embodiments, the unique code can be encoded using 11 bits or more (e.g., 11 bits, 21 bits). The unique code for each frequency band can differ by at least two bits relative to the unique code for each other frequency band of the plurality of frequency bands, such as by at least three bits, such as by at least four bits, such as by at least five bits, such as by at least six bits, such as by at least seven bits, such as by at least eight bits, etc. As a result, the unique code for each frequency band of the plurality of frequency bands is separated a significant distance (e.g., in terms of binary code) from the unique code for each of the other frequency bands.

The method 900 can include, at (904), communicating the transmit signal to an antenna circuit via a transmission line. For example, as described above with reference to FIG. 1, the control unit 160 can the transmit signal over a transmission line 150 to the antenna circuit 130. An RF filter can be configured to pass the RF signal and the control signal to the demodulation circuit 140, and a DC filter can be configured to pass the unregulated DC signal, which is converted into a regulated DC signal and sent to the demodulation circuit to supply power.

The method 900 can include, at (906), demodulating the control signal at the antenna circuit. For example, as described above with reference to FIGS. 1 and 4, the antenna circuit can comprise a demodulation circuit, which can be configured to demodulate the control signal from the transmit signal. The demodulation circuit 140, 440 can also be configured to filter and/or amplify the control signal. A logic circuit 442 can be configured to interpret control instructions associated with (e.g., contained in) the control signal.

For instance, at (908), the method can include processing the frame(s) of the control signal (e.g., the bits in the control signal) for error detection. For instance, the demodulation circuit, via logic circuit 442, can process the plurality of bits in the frame(s) to determine if the unique code matches a unique code assigned to a frequency band in the coding scheme.

At (910), if an error is detected, the method can proceed to (912) wherein the demodulation circuit maintains operating the RF communication path in the current selected frequency band. In other words, the demodulation circuit does not respond to the control signal containing the error and maintains the RF communication path in its current operation.

At (910), if no error is present the method can proceed to (712) to control the one or more configurable elements in the RF communication path in accordance with the selected frequency band specified by the unique code transmitted by the control unit. For instance, the method 900 can include adjusting one or more configurable elements in an RF communication path of the antenna circuit based at least in part on the control signal. In this way, the method 900 can include controlling, from the control unit, the RF communication path of the antenna circuit to operate in the selected frequency band via the control signal.

Figure 10:
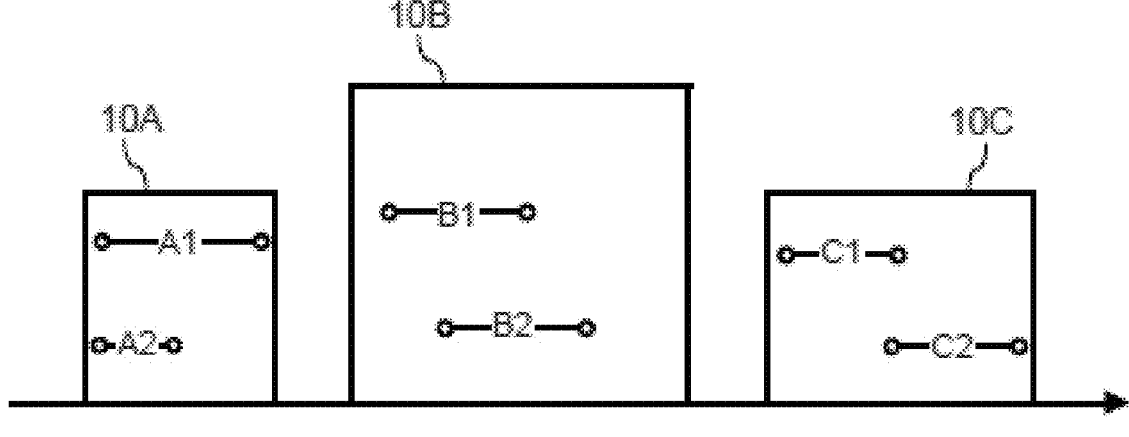
FIG. 10 illustrates an example allocation of frequency bands associated with the antenna system according to example embodiments of the present disclosure.

FIG. 10 illustrates an example allocation of frequency bands associated with the antennas of FIGS. 1 and 5 according to example embodiments of the present disclosure. FIG. 10 depicts a plurality of frequency bands 10A, 10B, and 10C. For instance, the antenna system can include an antenna operable in a selected frequency band. Frequency band 10A can be associated with a first frequency band. The antenna can be operable in frequency band 10A by being configured to operate in the first frequency band.

The plurality of frequency bands 10A, 10B, and 10C can be associated with signals transmitted within different frequency ranges. For instance, frequency band 10A can be associated with signals A1 and A2 transmitted within a frequency range associated with frequency band 10A. Frequency band 10B can be associated with signals B1 and B2 transmitted within a frequency range associated with frequency band 10B. Frequency band 10C can be associated with signals C1 and C2 transmitted within a frequency range associated with frequency band 10C. Accordingly, when the antenna is operable in the frequency band 10A, the antenna circuit can configure the RF communication path to operate in the selected frequency band (10A). The antenna circuit can thus be configured to receive signals A1 and A2. When the antenna is operable in the frequency band 10B, the antenna circuit can configure the RF communication path to operate in the selected frequency band (10B). The antenna circuit can thus be configured to receive signals B1 and B2. When the antenna is operable in the frequency band 10C, the antenna circuit can configure the RF communication path to operate in the selected frequency band (10C). The antenna circuit can thus be configured to receive signals C1 and C2.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system comprising:
   an antenna operable in a selected frequency band of a plurality of frequency bands;
   an antenna circuit comprising a radio frequency (RF) communication path, the antenna circuit comprising one or more configurable elements in the RF communication path;
   a transmission line coupled to the antenna circuit; and
   a control unit that is configured to modulate a control signal onto an RF signal to generate a transmit signal for communication over the transmission line to the antenna circuit, the control signal comprising a frame having a plurality of bits associated with the selected frequency band of the antenna, wherein the antenna circuit is configured to demodulate the control signal from the transmit signal communicated over the transmission line, the antenna circuit configured to adjust the one or more configurable elements in the RF communication path based at least in part on the control signal to configure the RF communication path to operate in the selected frequency band.

2. The antenna system of claim 1, wherein the control unit is configured to encode the plurality of bits associated with the selected frequency band in accordance with a coding scheme, the coding scheme specifying a unique code for each of the plurality of frequency bands in which the antenna is operable.

3. The antenna system of claim 2, wherein the antenna circuit is configured to process the frame to obtain a first code associated with the frame, the antenna circuit configured to determine whether the first code matches the unique code for one of the plurality of frequency bands in which the antenna is operable.

4. The antenna system of claim 1, wherein the antenna circuit is configured to receive power via the transmission line.

5. The antenna system of claim 1, wherein the antenna circuit is configured to receive power from a DC signal transmitted with the transmit signal.

6. The antenna system of claim 1, wherein the control signal based at least in part on a band-selection signal associated with the selected frequency band.

7. The antenna system of claim 6, wherein the control unit is coupled to a transceiver, the transceiver configured to provide the band-selection signal to the control unit.

8. An antenna system comprising:

an antenna operable in a selected frequency band of a plurality of frequency bands;

an antenna circuit comprising a radio frequency (RF) communication path, the antenna circuit comprising one or more configurable elements in the RF communication path;

a transmission line coupled to the antenna circuit;

a control unit comprising one or more processors configured to:

generate a control signal based at least in part on a band-selection signal associated with the selected frequency band; and modulate the control signal onto an RF signal to generate a transmit signal for communication over the transmission line to the antenna circuit, wherein the antenna circuit is configured to demodulate the control signal from the transmit signal communicated over the transmission line, the antenna circuit configured to adjust the one or more configurable elements in the RF communication path based at least in part on the control signal to configure the RF communication path to operate in the selected frequency band.

9. The antenna system of claim 8, wherein the control unit is coupled to a transceiver, the transceiver configured to provide the band-selection signal to the control unit.

10. The antenna system of claim 9, wherein the transceiver is coupled to the antenna circuit via the transmission line and configured to communicate an RF signal provided via the RF communication path and the transmission line.

11. The antenna system of claim 9, wherein the transceiver is configured to communicate an RF signal provided via the RF communication path and the transmission line.

12. The antenna system of claim 8, wherein the control signal comprises a frame having a plurality of bits associated with the selected frequency band of the antenna.

13. The antenna system of claim 12, wherein the control unit is configured to encode the plurality of bits associated with the selected frequency band in accordance with a coding scheme, the coding scheme specifying a unique code for each of the plurality of frequency bands in which the antenna is operable.

14. The antenna system of claim 13, wherein the antenna circuit is configured to process the frame to obtain a first code associated with the frame, the antenna circuit configured to determine whether the first code matches the unique code for one of the plurality of frequency bands in which the antenna is operable.

15. The antenna system of claim 8, wherein the antenna circuit is configured to receive power from a DC signal transmitted with the transmit signal.

16. The antenna system of claim 8, wherein the antenna circuit is configured to receive power via the transmission line.

*   *   *   *   *